United States Patent [19]
Chu

[11] Patent Number: 5,353,739
[45] Date of Patent: Oct. 11, 1994

[54] AUTOMATIC ANIMAL FOOD FEEDING APPARATUS

[76] Inventor: King Ming Chu, No. 6, Lane 86, An Chung Road, Hsintien, Taipei Hsien, Taiwan

[21] Appl. No.: 126,889

[22] Filed: Sep. 27, 1993

[51] Int. Cl.⁵ .............................................. A01K 5/00
[52] U.S. Cl. ................. 119/51.03; 222/367; 222/410; 119/54
[58] Field of Search ............... 119/51.03, 51.12, 52.1, 119/53.5, 54, 56.1, 58; 222/457, 410, 367

[56] References Cited

U.S. PATENT DOCUMENTS

| | | | |
|---|---|---|---|
| 2,544,578 | 3/1951 | Winkler | 119/54 |
| 2,936,734 | 5/1960 | Chestnut, Jr. et al. | 119/52.1 |
| 3,074,377 | 1/1963 | Spencer | 119/52.1 X |
| 4,353,329 | 10/1982 | Thibault | 119/52.1 |
| 4,889,078 | 12/1989 | Smiley | 119/52.1 X |
| 5,044,318 | 9/1991 | Sutton et al. | 119/53.5 |

*Primary Examiner*—Thomas Price
*Attorney, Agent, or Firm*—Jones, Tullar & Cooper

[57] ABSTRACT

An automatic animal food feeding apparatus includes a base member having a top recess, a rotary table revolvably supported within the top recess of the base member by steel balls and having a conical center shaft with axial blades, a food container covered with a top cover and a bottom cap and supported on the base member above the rotary table, whereby the rotary table is turned as the animal passes its tongue over it, causing the blades to propel a grained food out of the food container through a food outlet on the bottom cap.

6 Claims, 3 Drawing Sheets

AUTOMATIC ANIMAL FOOD FEEDING APPARATUS

BACKGROUND OF THE INVENTION

The present invention relates to an automatic animal food feeding apparatus which supplies a grained food automatically as the animal passes its tongue over a rotary table thereof.

While feeding animals, people tend to use a dish to carry the food. While eating, the food may be removed from the dish and scattered over the floor covering. U.S. Pat. No. 4,134,365 discloses an automatic feeding apparatus which eliminates the aforesaid problem. However, the structure of this automatic feeding apparatus is still functionally not satisfactory because food will automatically fall down to the hopper to replace the food that has been eaten, therefore the food dish is constantly filled with a certain amount of food even when the animal has been stuffed with food.

SUMMARY OF THE INVENTION

The present invention eliminates the aforesaid disadvantages. It is therefore the principal object of the present invention to provide an automatic animal rood feeding apparatus which gives food to the animals only when the animals pass their tongues over the food outlet area of the apparatus.

To achieve tile aforesaid object, there is provided an automatic animal food feeding apparatus comprising a base member having a top recess, a rotary table revolvably supported within the top recess of the base member by steel balls and having a conical center shaft with axial blades, a food container covered with a top cover and a bottom cap and supported on the base member above the rotary table. The rotary table is turned as the animal passes its tongue over it, causing the blades to propel a grained food out of the food container through a food outlet and onto the bottom cap. The blades are stopped from propelling the grained food out of the food container as the animals stop licking the rotary table.

DETAILED DESCRIPTION OF THE PREFERRED EMBODIMENT

Figure 1:
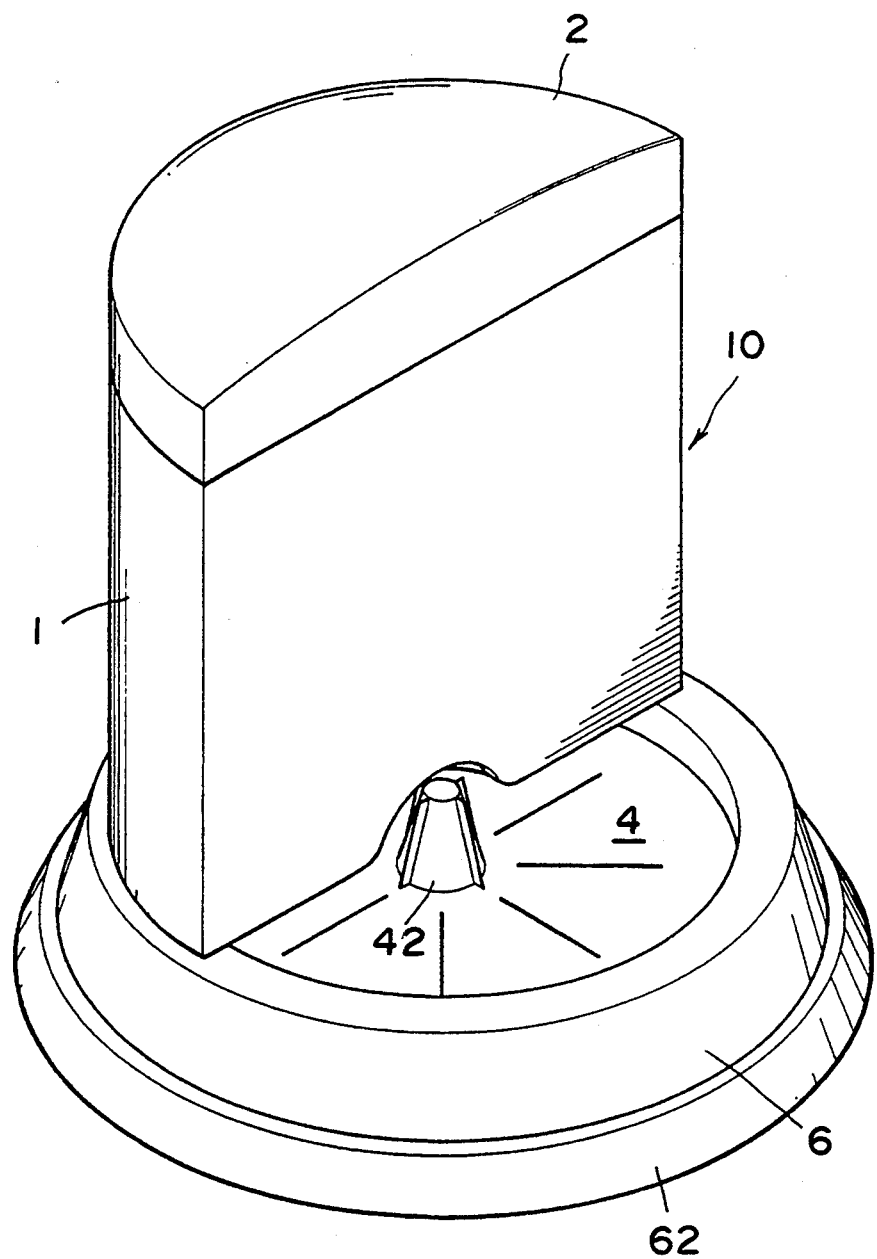
FIG. 1 is an elevational view of an automatic animal food feeding apparatus according to the preferred embodiment of the present invention.
Figure 2:
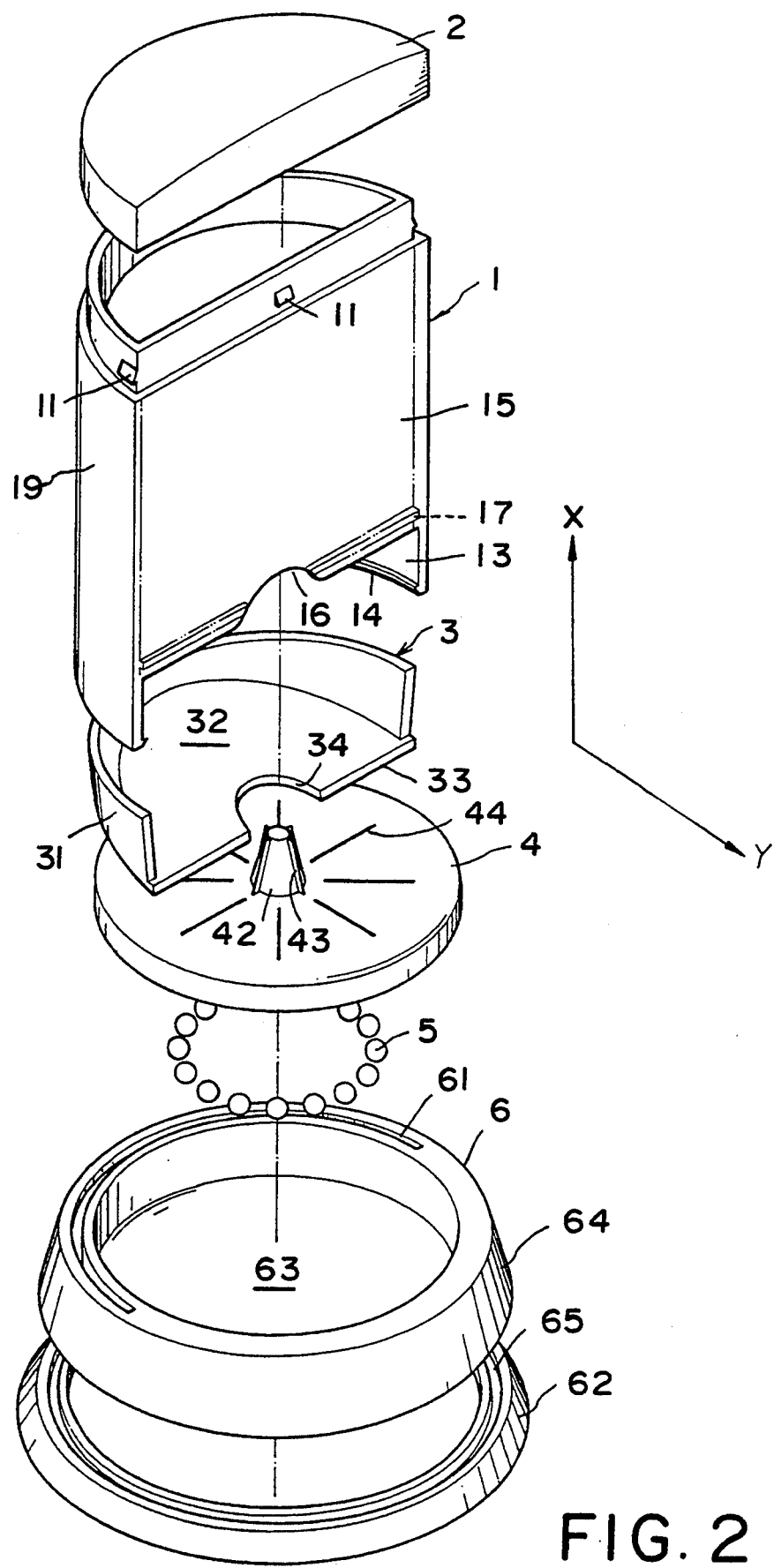
FIG. 2 is an exploded view of the automatic animal food feeding apparatus shown in FIG. 1.

Referring to FIGS. 1 and 2, the automatic animal food feeding apparatus 10 is generally comprised of a food container 1, a cover 2, a bottom cap 3. a rotary table 4, steel balls 5, and a base member 6.

Referring to FIG. 2 again, the food container 1 comprises a flat wall 15 and a curved wall 19 connected together and formed into a hollow, half-round cylinder. A plurality of raised portions 11 are spaced around the top end of the flat wall 15 and the curved wall 19. The flat wall 15 includes a horizontal groove 17 on the outside along the bottom end thereof, and a hal,-round opening 10 on the bottom end thereof in the middle of the horizontal groove 17. The curved wall 19 includes a plug portion 13 at the bottom disposed at all elevation lower than the bottom end of the flat wall 15, and an inward bottom flange 14 raised from the inside surface of tile plug portion 13.

Figure 3:
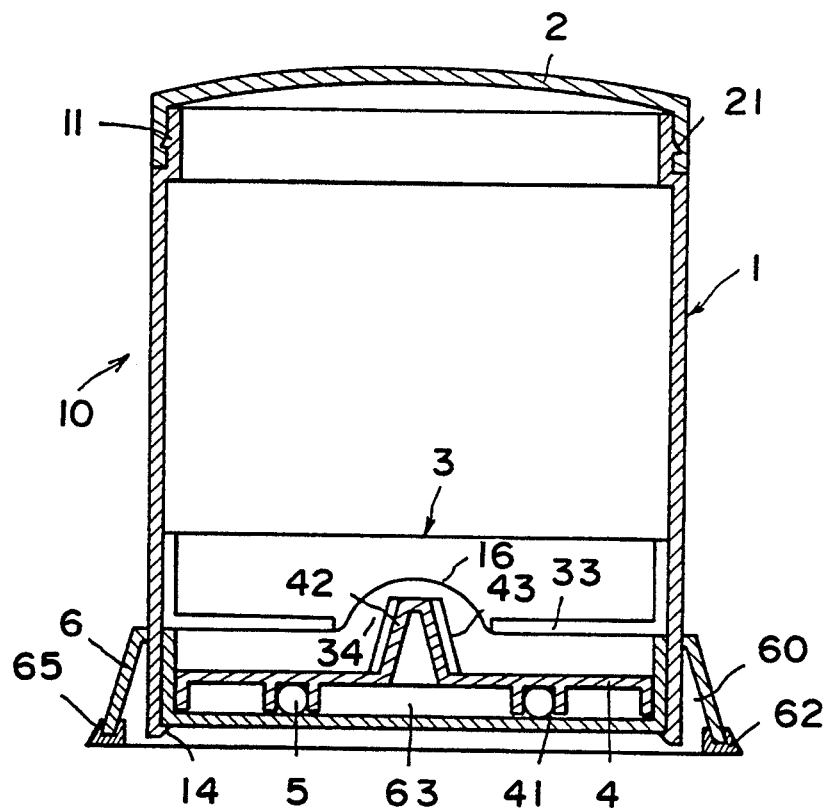
FIG. 3 is a sectional view taken on FIG. 2 along the X-axis.

Referring to FIG. 3 and FIG. 2 again, the cover 2 covers the top of the food container 1. The cover 2 has a plurality of recessed portions 21 into which the raised portions 11 on the rood container 1 engage respectively.

Referring to FIGS. 2 and 3 again, the base member 6 comprises a peripheral wall 64 made gradually smaller toward the top, a circular recess 63 surrounded within the peripheral wall 64 at the bottom, a slot 61 along the top edge of the peripheral wall, and an annular bottom hole 60 around the border in communication with the slot 61. During the assembly process, the plug portion 13 of the food container 1 is inserted through the slot 61, permitting the inward bottom flange 14 to hook onto an inner bottom edge of the base member 6.(see FIG. 3). An anti-skid cushion 62 may be fastened to the base member 6 at the bottom so that the base member 6 can be stably supported on a flat surface. The anti-skid cushion 62 is made from a suitable material or high coefficient or friction (such as rubber), having an annular groove 65 on the top along its border into which the bottom edge of the peripheral wall 64 fits.

Figure 4:
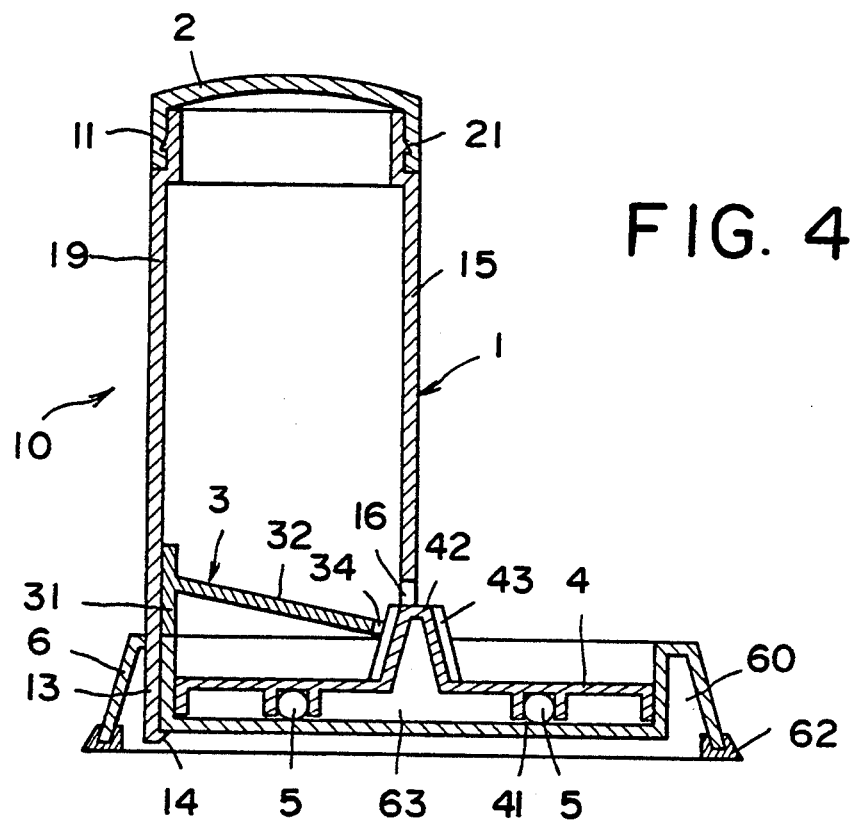
FIG. 4 is a sectional view taken on FIG. 2 along the Y-axis.

Referring to FIG. 4 and FIG. 2 again, the bottom cap 3 is made in a half-round configuration, comprising a half-round bottom wall 32 supported on the top of the base member 6 and slopes in one direction, a curved vertical wall 31 extending along the half-round bottom wall 32 along the border and fitted at the bottom into the food container 1, a flange 33 extending along the straight end of the half-round bottom wall and hooked onto the horizontal groove 17 of the flat wall 15 of the food container 1, and a feed outlet 34 on the half-round bottom wall 32 in the middle of the flange 33. The half-round bottom wall 32 slopes from the curved vertical wall 31 toward the feed outlet 34.

Referring to FIGS. 2 and 4 again, the rotary table 4 is made in the shape of a circular flat board revolvably received in the circular recess 63 inside tile base member 6. The table 4 includes an annular groove 41 on the bottom, which receives the steel balls 5, a conical center shaft 42 upstanding from the center, a plurality of blades 43 mounted around tile conical center shaft 42 in the axial direction, and radial ribs 44 spaced on the top surface thereof around the conical center shaft 42. When assembled, the rotary table 4 is received within the circular recess 63 below tile bottom cap 3 and supported on tile steel balls 5, with the the conical center shaft 42 projected through the feed outlet 34 and disposed at one side by the half-round opening 16 on the flat wall 15 of the food container 1. The half-round opening 16 provides a sufficient space for rotary motion of the conical center shaft 43 in propelling a grained food out of the food container through its food outlet 34.

When an animal passes the tongue over the rotary table 4, the rotary table 4 will be turned on the base member 6, causing the blades 43 to propel a grained food out of the food container 1 through the food outlet 34. As a certain amount of the grained food is moved out of the bottom cap 3, the radial ribs 44 on the rotary table 4 immediately carry the grained food to the outside for the animal. When the animal stops licking the rotary table 4, the blades 43 of the conical center shaft 42 are immediately stopped from propelling the grained food from the food container 1.

While only one embodiment of the present invention has been shown and described, it will be understood that various modifications and changes could be made without departing from the spirit and scope of the invention.

What is claimed is:

1. An automatic animal food feeding apparatus, comprising:
    a base member having a top surface, a circular recess extending downwardly from the top surface, and a slot extending into the top surface and around a portion thereof;
    a removable cover;
    a food container having a bottom plug portion extending from one end thereof, said bottom plug portion being fitted into said slot, a top opening defined at the other end thereof covered with said removable cover, and a bottom opening disposed above said base member;
    a bottom cap covering said bottom opening of said food container, said bottom cap having a sloping bottom wall and a food outlet situated at the lowest point of said sloping bottom wall;
    a rotary table supported for rotation within said circular recess of said base member, said rotary table having a top surface, a conical center shaft upstanding from the center of said top surface of said rotary table, and a plurality of blades mounted around said conical center shaft in the axial direction thereof; and
    a plurality of steel balls retained in said circular recess of said base member to support said rotary table within said base member and permit said rotary table to be turned on said base member by the tongue of an animal upon licking;
    whereby turning said rotary table causes said blades to propel a grained food in said food container out of said food container through said food outlet.

2. The automatic animal food feeding apparatus of claim 1, further comprising an anti-skid cushion, and wherein said base member is fastened with said anti-skid cushion at the bottom of said base member.

3. The automatic animal food feeding apparatus of claim 1, wherein said food container further has another opening on a front side and at the bottom thereof, providing a space for rotary motion of said conical center shaft and said blades.

4. The automatic animal food feeding apparatus of claim 1, wherein said food container further has a horizontal groove, said bottom cap further has a sloping bottom wall, a vertical wall fitted into said bottom opening of said food container, and a horizontal flange on one end of said sloping bottom wall thereof hooked onto said horizontal groove on said food container.

5. The automatic animal food feeding apparatus of claim 1, wherein said rotary table further has a bottom surface, and an annular groove extending downwardly from said bottom surface thereof along the border, which receives said steel balls.

6. The automatic animal food feeding apparatus of claim 1, wherein said rotary table further has a plurality of radial ribs spaced on the top surface thereof and around said conical center shaft.

* * * * *